United States Patent
Lee

(10) Patent No.: US 8,448,452 B2
(45) Date of Patent: May 28, 2013

(54) SHUTTLE TYPE MAGNETIC REFRIGERATOR

(75) Inventor: Dong-Kwan Lee, Seoul (KR)

(73) Assignee: Daewoo Electronics Corporation, Seoul (KR)

( * ) Notice: Subject to any disclaimer, the term of this patent is extended or adjusted under 35 U.S.C. 154(b) by 959 days.

(21) Appl. No.: 12/307,885

(22) PCT Filed: Nov. 13, 2006

(86) PCT No.: PCT/KR2006/004730
§ 371 (c)(1),
(2), (4) Date: Feb. 25, 2009

(87) PCT Pub. No.: WO2008/007834
PCT Pub. Date: Jan. 17, 2008

(65) Prior Publication Data
US 2009/0308079 A1    Dec. 17, 2009

(30) Foreign Application Priority Data

Jul. 10, 2006 (KR) .......... 10-2006-0064343
Aug. 7, 2006 (KR) .......... 10-2006-0074240

(51) Int. Cl.
*F25B 21/00* (2006.01)
*F25B 21/02* (2006.01)

(52) U.S. Cl.
USPC ................................ 62/3.1; 62/914

(58) Field of Classification Search
USPC ............................................. 62/3, 1, 914
See application file for complete search history.

(56) References Cited

U.S. PATENT DOCUMENTS

| | | | |
|---|---|---|---|
| 4,332,135 A | | 6/1982 | Barclay et al. |
| 4,507,927 A | * | 4/1985 | Barclay .......... 62/467 |
| 4,727,721 A | * | 3/1988 | Peschka et al. ...... 62/3.1 |
| 4,735,053 A | * | 4/1988 | Carpetis .............. 62/6 |
| 5,156,003 A | * | 10/1992 | Yoshiro et al. ....... 62/3.1 |
| 5,249,424 A | * | 10/1993 | DeGregoria et al. ... 62/3.1 |
| 5,934,078 A | * | 8/1999 | Lawton et al. ....... 62/3.1 |
| 6,526,759 B2 | * | 3/2003 | Zimm et al. ......... 62/3.1 |
| 6,826,915 B2 | | 12/2004 | Wada et al. |
| 2004/0093877 A1 | * | 5/2004 | Wada et al. ......... 62/114 |

FOREIGN PATENT DOCUMENTS

JP    2002-106999 A    4/2002

OTHER PUBLICATIONS

International Search Report of PCT/KR2006/004730, dated Apr. 9, 2007.

* cited by examiner

*Primary Examiner* — Frantz Jules
*Assistant Examiner* — Keith Raymond
(74) *Attorney, Agent, or Firm* — Hamre, Schumann, Mueller & Larson, P.C.

(57) ABSTRACT

The present invention relates to a shuttle type magnetic refrigerator wherein a cold-side heat exchanger 160 is thermally coupled between a far-side inlet/outlet of a first AMR bed and a far-side inlet/outlet of a second AMR bed.

2 Claims, 15 Drawing Sheets

SHUTTLE TYPE MAGNETIC REFRIGERATOR

TECHNICAL FIELD

The present invention relates to a shuttle type magnetic refrigerator.

BACKGROUND ART

A conventional active magnetic regenerator is disclosed in U.S. Pat. No. 6,826,915. As shown in FIGS. 1 and 2, in accordance with the conventional active magnetic regenerator including the above-described cycle, a temperature of the heat transfer fluid heated in a first AMR bed 10A in the magnetic field is dropped to an atmospheric temperature by a hot-side heat exchanger 70 and the heat transfer fluid is then passed through the second AMR bed 10B. At the same time, since the second AMR bed 10B is outside the magnetic field, a magnetic refrigerant material layer 16 has a low temperature, the temperature of the heat transfer fluid drops while passing through the magnetic refrigerant material layer 16. The heat transfer fluid having the low temperature passes through a cold-side heat exchanger 60 and then enters the first AMR bed 10A to be heated. The heat transfer fluid then flows to the hot-side heat exchanger 70, the second AMR bed 10B and the cold-side heat exchanger 60 to complete the one cycle. Contrarily, when the second AMR bed 10B is moved to a magnet circuit 22 by a movable mechanism 24, a channel switch 30 reverses the flow of the heat transfer fluid to generate a reverse cycle.

On the other hand, as shown in FIG. 2, an AMR bed 10 includes a container 12 of a cylinder type, a plurality of magnetic refrigerant material layers 16 stored inside the container 12, and meshes 14. The container 12 includes heat transfer fluid inlet/outlet ports 18a and 18b, which may be connected to the heat exchange tube 32 or 34.

However, with respect to a direction of an arrow in FIG. 1, the inlet port 18a of each of the reciprocating AMR beds 10 is a near-side inlet port 18a close to the magnet circuit 22, and the outlet port 18b is a far-side inlet port 18b far from the magnet circuit 22. Therefore, a temperature of a magnetic refrigerant material 16a at the near-side inlet port 18a is higher than that of a magnetic refrigerant material 16b at the far-side inlet port 18b the near-side inlet port 18a enters the magnet circuit 22 first and the far-side inlet port 18b enters the magnet circuit 22 last.

The heat transfer fluid flows as shown in FIG. 3 when the AMR bed 10 is at the magnet circuit 22 since the near-side inlet port 18a of the first AMR bed 10A and the far-side inlet port 18b of the second AMR bed 10B having such a temperature distribution is thermally coupled to the cold-side heat exchanger 60.

That is, a temperature slope changes from a dotted line (prior to the flow of the heat transfer fluid) to a solid line (after the flow of the heat transfer fluid) since the heat transfer fluid having the atmospheric temperature that has passed through the cold-side heat exchanger 60 flows from the hot-side to the cold-side. Therefore, the conventional active magnetic regenerator cannot be used in accordance with an original purpose thereof such as in an air conditioner due to a performance degradation since an initial temperature is erased due to the heat transfer fluid flowing from the hot-side to the cold-side.

DISCLOSURE OF INVENTION

Technical Problem

However, the inlet/outlet ports 18a and 18b are installed at a center portion of the container 12. Therefore, the heat transfer fluid does not flow through an entire cross-section of the container 12, which renders the heat transfer fluid to flow through the magnetic refrigerant material 16 at the same spot, thereby making a smooth heat exchange difficult.

Technical Solution

It is an object of the present invention to provide a shuttle type magnetic refrigerator wherein a temperature slope of an AMR bed is maintained.

In order to achieve the above-described object, there is provided a shuttle type magnetic refrigerator, comprising: an AMR including a first AMR bed and a second AMR bed including a magnetic material for passing through a flow of a heat transfer fluid; a magnet; an AMR moving member for reciprocating the first AMR bed and the second AMR bed to the magnet to mutually apply or erase a magnetic field; and cold-side and hot-side heat exchangers thermally connected to the first AMR bed and the second AMR bed, wherein each of the first AMR bed and the second AMR bed comprises a near-side inlet/outlet and a far-side inlet/outlet, the near-side inlet/outlet being disposed at a close end thereof closer to the magnet and a far-side inlet/outlet disposed at a far end thereof farther from the magnet compared to the near-side inlet/outlet, and wherein the cold-side heat exchanger is disposed at the far-side inlet/outlet of the first AMR bed and at the near-side inlet/outlet of the second AMR bed.

In accordance with the shuttle type magnetic refrigerator, the first AMR bed and the second AMR bed comprise first and second through-holes being filled up with the magnetic material in a lengthwise direction thereof, wherein a first cold-side AMR nozzle and a second cold-side AMR nozzle connected to the first and the second through-holes are coupled to the far-side inlet/outlets of the first AMR bed and the second AMR, wherein a first hot-side AMR nozzle and a second hot-side AMR nozzle connected to the first and the second through-holes are coupled to the near-side inlet/outlets of the first AMR bed and the second AMR, and wherein at least one of the AMR nozzles includes a distribution chamber for uniformly distributing the heat transfer fluid to an entirety of a cross-section of the through-holes, in order to uniformly distribute the heat transfer fluid throughout a cross-section of the flow path of the through-holes.

Advantageous Effects

In accordance with the shuttle type magnetic refrigerator, when the AMRs include a plastic, a wide temperature slope is obtained by an adiabatic state.

Moreover, when a mesh and a packing are disposed at the near-side inlet/outlet and the far-side inlet/outlet of the first AMR bed the near-side inlet/outlet and the far-side inlet/outlet of the second AMR bed respectively, a leakage of the magnetic material and the heat transfer fluid is prevented.

In addition, when each of the first through-hole and the second through-hole comprises an upper through-hole and a lower through-hole divided by a ribbed compartment, a distortion of the AMR bed due to a pressure of the heat transfer fluid is prevented.

BRIEF DESCRIPTION OF THE DRAWINGS

FIGS. 7 through 16 are diagrams illustrating a cycle of a magnetic refrigerator, wherein FIG. 10 illustrates temperature slope of a first AMR of FIG. 9.

Figure 1:
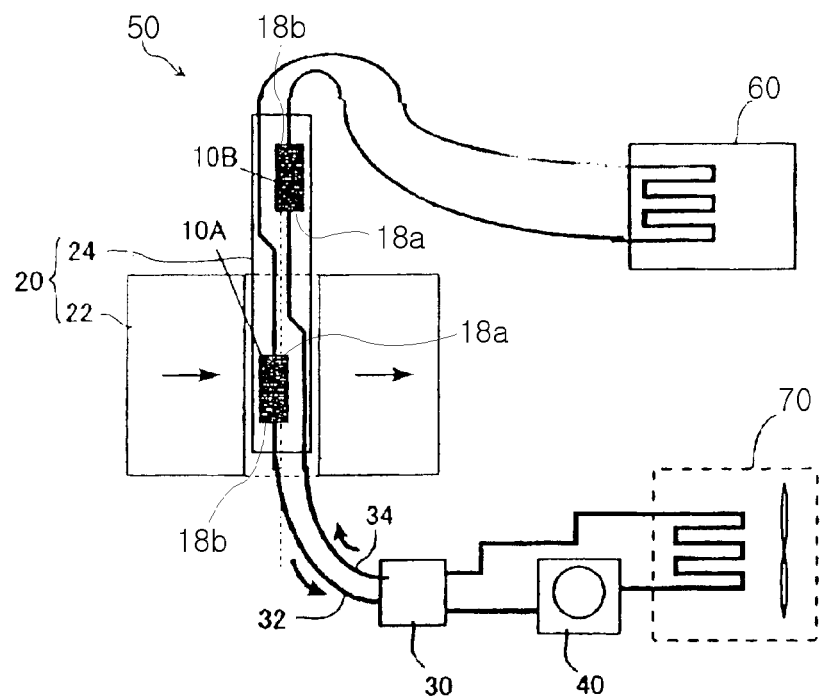
FIG. 1 is a schematic diagram illustrating a configuration of a conventional active magnetic refrigerator.
Figure 2:
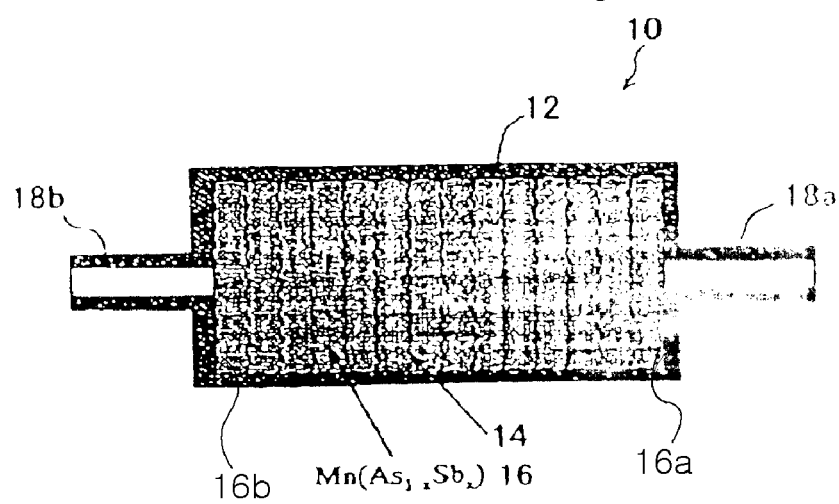
FIG. 2 is a cross-sectional diagram illustrating an AMR bed of FIG. 1.
Figure 3:
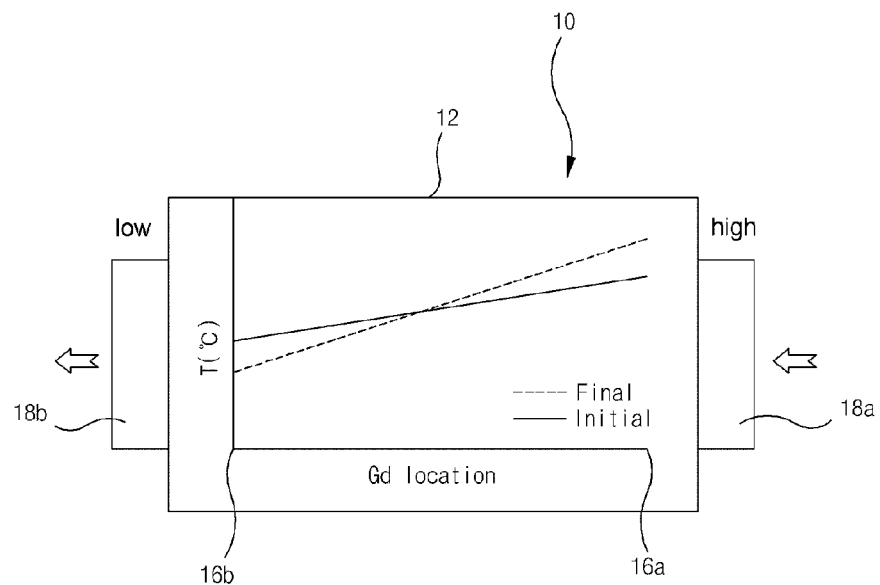
FIG. 3 is a graph illustrating a temperature slope of a first AMR of FIG. 1.

DESCRIPTION OF REFERENCE NUMERALS 40,140: pump
60,160: cold-side heat exchangers
70,170: hot-side heat exchangers
100: regenerator
110: AMR
110A, 110B: AMR beds
110AL, 110BL: far-side inlet/outlet (cold-side magnetic material)
110AH, 110BH: near-side inlet/outlet (hot-side magnetic material)
114A, 114B: through-holes
115: mounting groove
120: ARM connector
120A, 120B: AMR nozzles
120AL, 120BL: cold-side inlet/outlet of heat transfer fluid
120AH, 120BH: hot-side inlet/outlet of heat transfer fluid
210: magnet member
211: magnet
213: body
230: AMR moving member
M: mesh
R: ribbed compartment
S: packing
SOL1, SOL2: solenoid valves

BEST MODE FOR CARRYING OUT THE INVENTION

The above-described objects and other objects and characteristics and advantages of the present invention will now be described in detail with reference to the accompanied drawings.

Figure 4:
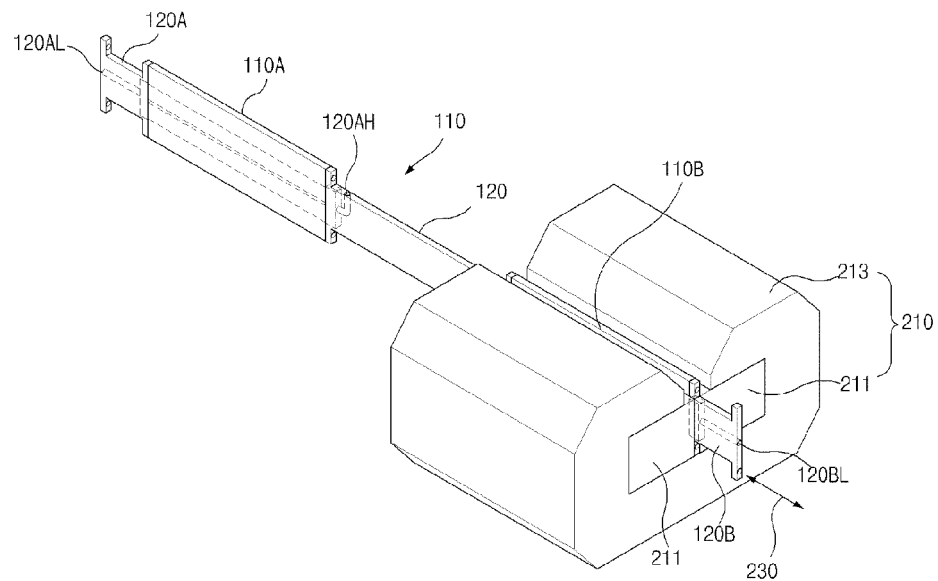
FIGS. 4 and 5 are a perspective view and a plan view respectively illustrating a shuttle type regenerator in accordance with a preferred embodiment of the present invention.
Figure 5:
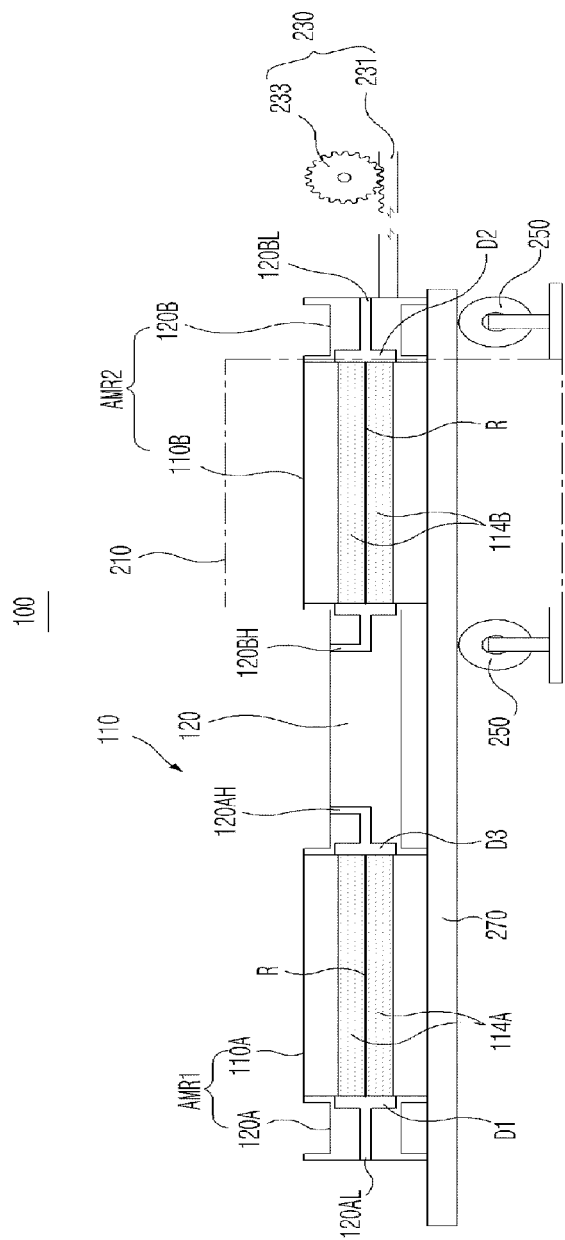
Figure 6:
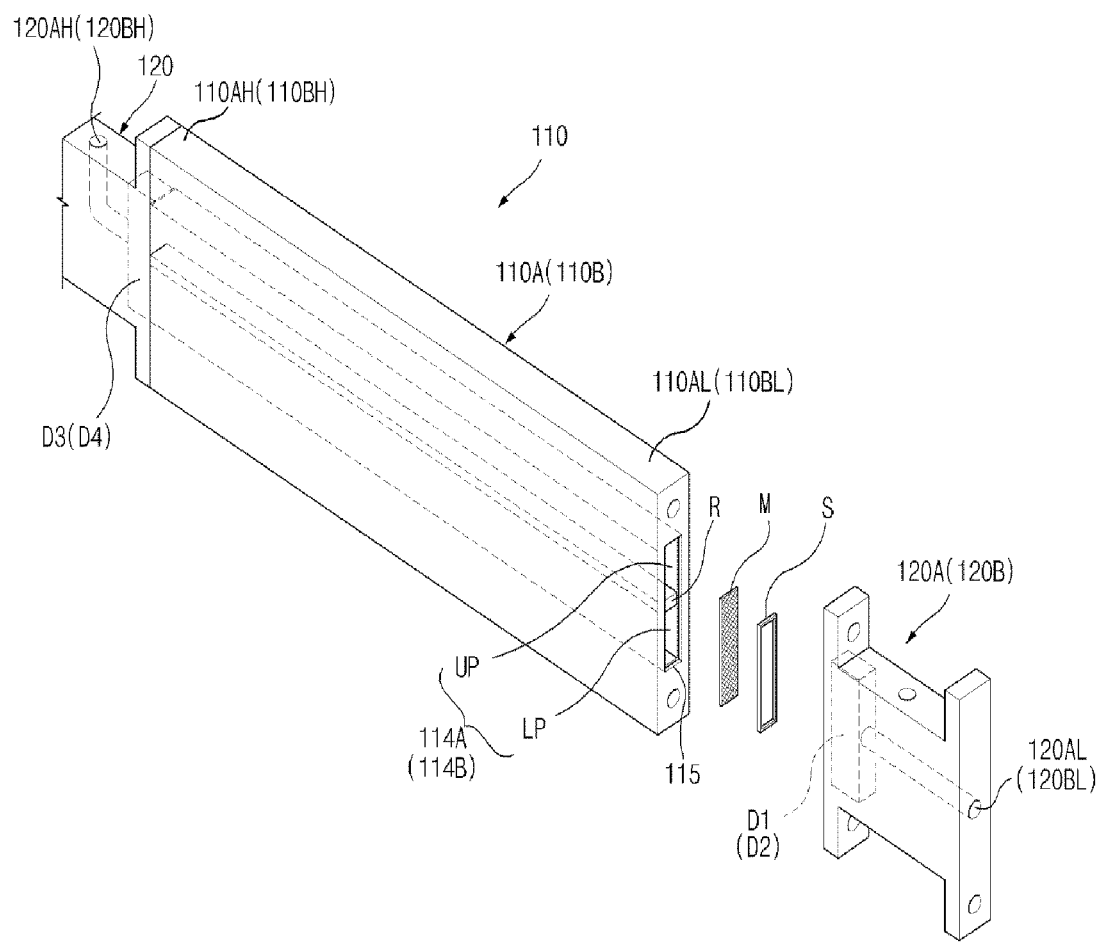
FIG. 6 is a perspective disassembled view illustrating a main portion of an AMR of FIG. 4.

FIGS. 4 and 5 are a perspective view and a plan view respectively illustrating a shuttle type regenerator in accordance with a preferred embodiment of the present invention, FIG. 6 is a perspective disassembled view illustrating a main portion of an AMR of FIG. 4, and FIGS. 7 through 16 are diagrams illustrating a cycle of a magnetic refrigerator.

As shown in FIGS. 4 through 16, a magnetic refrigerator in accordance with a preferred embodiment of the present invention comprises a regenerator 100, a cold-side heat exchanger 160 and a hot-side heat exchanger 170 thermally connected to the regenerator 100. While the cold-side heat exchanger 160 performs a cooling, the hot-side heat exchanger 170 performs a heat emission.

As shown in FIGS. 4 through 6, the regenerator 100 comprises an AMR 110, a magnet member 210 and a magnet rotating assembly for applying or erasing a magnetic field to the AMR 110.

The AMR 110 comprises a first AMR bed 110A and a second AMR bed 110B. A first through-hole 114A and a second through-hole 114B to be filled up with a magnetic material are formed in the first AMR bed 110A and the second AMR bed 110B in a lengthwise direction thereof, respectively.

A first far-side inlet/outlet 110AL and a second far-side inlet/outlet 110BL disposed at a position relatively far from a magnet 210 are formed at an outer side of the first AMR bed 110A and the second AMR bed 110B. Since the far-side inlet/outlets 110AL and 110BL enters the magnet 210 relatively later than a first near-side inlet/outlet 110AH and a second near-side inlet/outlet 110BH when reciprocating, a temperature thereof is lower. In addition, it is preferable that a first cold-side AMR nozzle 120A and a second cold-side AMR nozzle 120B connected to the first through-hole 114A and the second through-hole 114B is coupled to the first far-side inlet/outlet 110AL and the second far-side inlet/outlet 110BL.

Moreover, the first near-side inlet/outlet 110AH and the second near-side inlet/outlet 110BH of the hot-side are disposed at an inner side (a facing side) of the first AMR bed 110A and the second AMR bed 110B since the first near-side inlet/outlet 110AH and the second near-side inlet/outlet 110BH enters the magnet 210 relatively earlier than the first far-side inlet/outlet 110AL and the second far-side inlet/outlet 110BL. In addition, an AMR connector 120 including a first hot-side AMR nozzle and a second hot-side AMR nozzle connected to the first through-hole 114A and the second through-hole 114B is coupled to an inner side of the first near-side inlet/outlet 110AH and the second near-side inlet/outlet 110BH.

Figure 10:
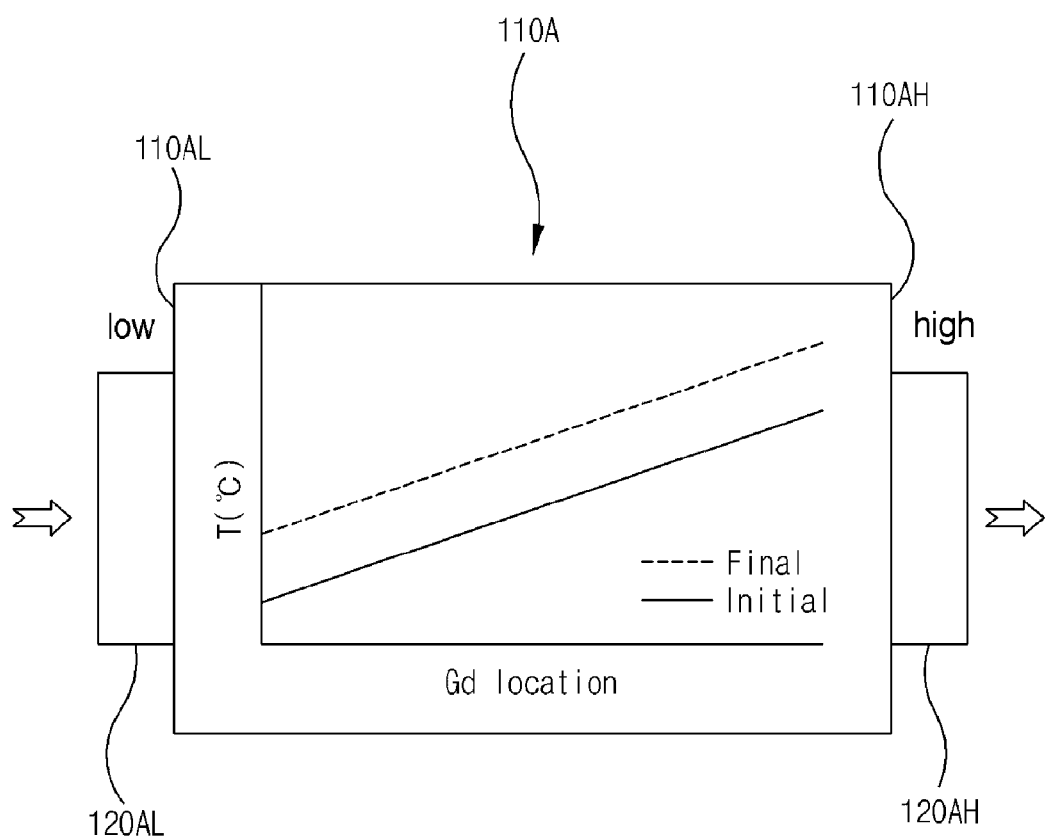

In accordance with a structure of the AMR, the cold-side heat exchanger 160 is connected to the first far-side inlet/outlet 110AL of the first AMR bed and the second far-side inlet/outlet 110BL of the second AMR bed. As shown in FIG. 10, since a heat transfer fluid having a atmospheric temperature that has passed through the cold-side heat exchanger 160 passes through the magnetic material from the cold-side to the hot-side due to the structure, a slope of an initial temperature and a final temperature is maintained without being mixed to obtain a wide temperature range of the AMR bed.

In addition, since the AMR connector 120 is disposed between the first AMR bed 110A and the second AMR bed 110B, when one of the AMR bed is in a magnet 211, the other one of the AMR bed is outside the magnet 211. That is, a cycle wherein one of the AMR bed is heated and the other is cooled is repeated. The reason that the AMR connector 120 is disposed between the AMR beds 110A and 110B is that the heat transfer fluid should not flow when the AMR beds 110A and 110B exits a magnetic field. A length of the AMR connector 120 is substantially the same as that of the single AMR bed.

Moreover, the AMR connector 120 having the AMR nozzles at the hot-side and the cold-side AMR nozzles 120A and 120B serves as a flow path for the heat transfer fluid. That is, a first cold-side inlet/outlet 120AL and a distribution chamber D1 are disposed at both ends of the first cold-side AMR nozzle 120A and a second cold-side inlet/outlet 120BL and a distribution chamber D2 are disposed at both ends of the second cold-side AMR nozzle 120B. The distribution chambers D1 and D2 serve as a distribution chamber for uniformly distributing the heat transfer fluid throughout a cross-section of the flow path of the through-holes 114A and 114B. Therefore, a partial contact with the magnetic material and a corrugated shape is minimized to improve the heat exchange efficiency since the heat transfer fluid proceeds at the cold-side inlet/outlets 120AL and 120BL at a sufficient velocity to be diffused at the distribution chambers D1 and D2, thereby flowing through the entire the through-holes 114A and 114B.

A first hot-side nozzle and a second hot-side nozzle are disposed at both ends of the AMR connector 120. A distribution chamber D3 connected to the first through-hole 114A and a hot-side inlet/outlet 120AH are disposed at the first hot-side nozzle and a distribution chamber D4 and a second hot-side inlet/outlet 120BH are disposed at the second hot-side nozzle. The first cold-side inlet/outlet 120AL, the second cold-side inlet/outlet 120BL, the first hot-side inlet/outlet 120AH and the second hot-side inlet/outlet 120BH are connected to heat exchange tubes 132 and 134.

Due to an above-described structure of the AMR 110, the heat transfer fluid always passes through the magnetic material, thereby improving the heat exchange efficiency. Moreover, an adiabatic state is achieved by preventing an exposure of the magnetic material to outside, resulting in the improvement of the heat exchange efficiency.

In addition, it is preferable that the AMR beds 110A and 110B or the entire AMR bed 110 comprises a plastic. The plastic has a large adiabatic effect and a wide temperature slope.

On the other hand, each of the through-holes 114A and 114B comprise an upper through-hole UP and a lower through-hole LP divided by a ribbed compartment R. The ribbed compartment R serves a function of a rib such that the ribbed compartment R prevents a distortion of the AMR bed 111 due to a pressure.

It is preferable that a mesh M and plastic packing S are mounted at a mounting groove 115 of the through-holes 114A and 114B in order to prevent a leakage of the magnetic material and the heat transfer fluid.

The cold-side heat exchanger 160 and the hot-side heat exchanger 170 are thermally coupled to the AMR 110 through heat exchange tubes 132, 133, 134, 135 and 136. The flow of the heat transfer fluid is formed by a pump 140. In addition, a change of a direction of the heat transfer fluid is carried out by solenoid valves SOL1 and SOL2.

An AMR moving member 230 is a mechanism for reciprocating the AMR 110, wherein the AMR moving member 230 comprises a rack 231 attached to the AMR 110, a pinion 233 engaged with the rack 231 and a motor (not shown) for transferring a rotational power to the pinion 233.

While the rack 231 may be attached to both an AMR1 and an AMR2, this structure requires a large space due to a complex structure. Therefore, it is preferable that the AMR 110 is supported by a plurality of rollers 250 when a single rack 231 is supporting the AMR 110. This structure prevents a heat generated by a frictional force between the reciprocating AMR beds 110A and 110B and a magnet member 213 from conducting to the AMR beds 110A and 110B to improve the heat exchange efficiency, and also allows a reciprocating motion with a small energy due to a small frictional force. It is preferable that the AMR 110 is supported by the roller 250 after being supported by an AMR supporting plate 270. At this time, the AMR moving member 230 may be connected to the AMR supporting plate 270.

The cyclic operation of the magnetic refrigerator in accordance with the preferred embodiment of the present invention will now be described with reference to FIGS. 7 through 16. It should be noted that the solenoid valves shown in FIGS. 7 through 16 switches in a manner that the solenoid valves operates as an elbow type when OFF and as a straight type when ON.

Figure 7:
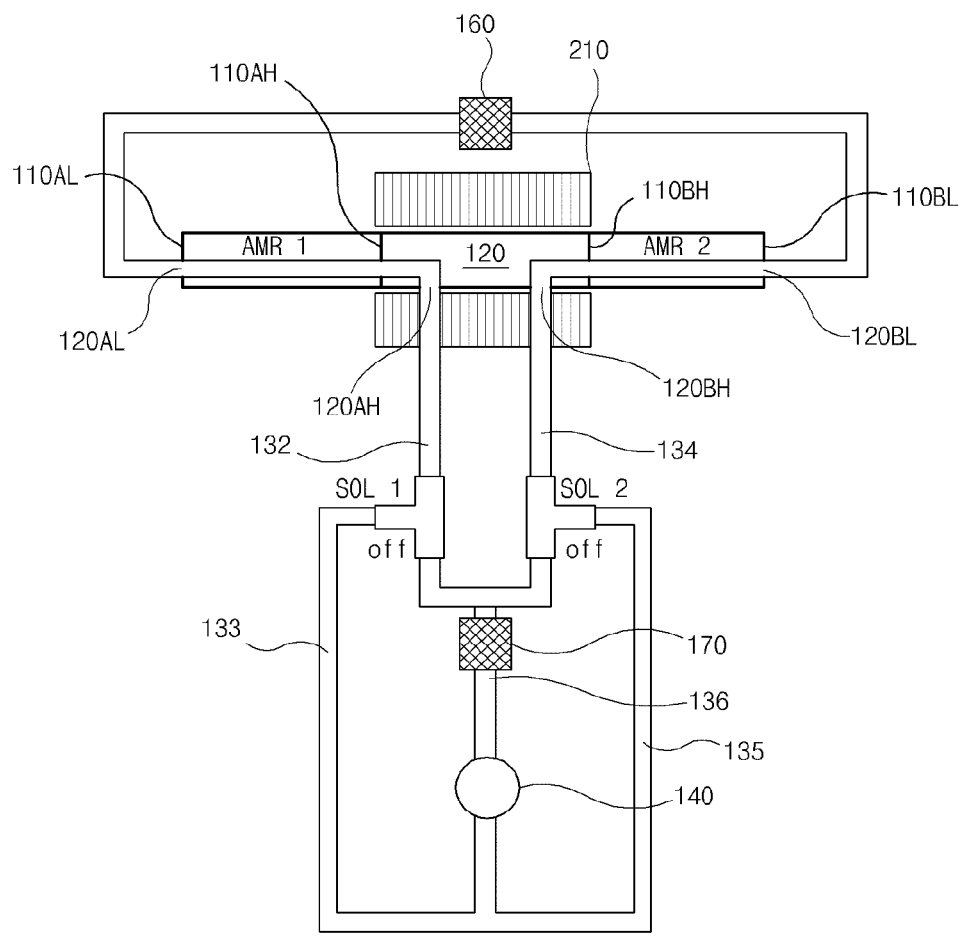

FIG. 7 illustrates a state wherein the AMR connector 120 is accurately positioned in the magnet 211. Since the heat transfer fluid should not flow in the AMR1 and the AMR2 at the moment, the solenoid valves SOL1 and SOL2 are in an OFF state.

Figure 8:
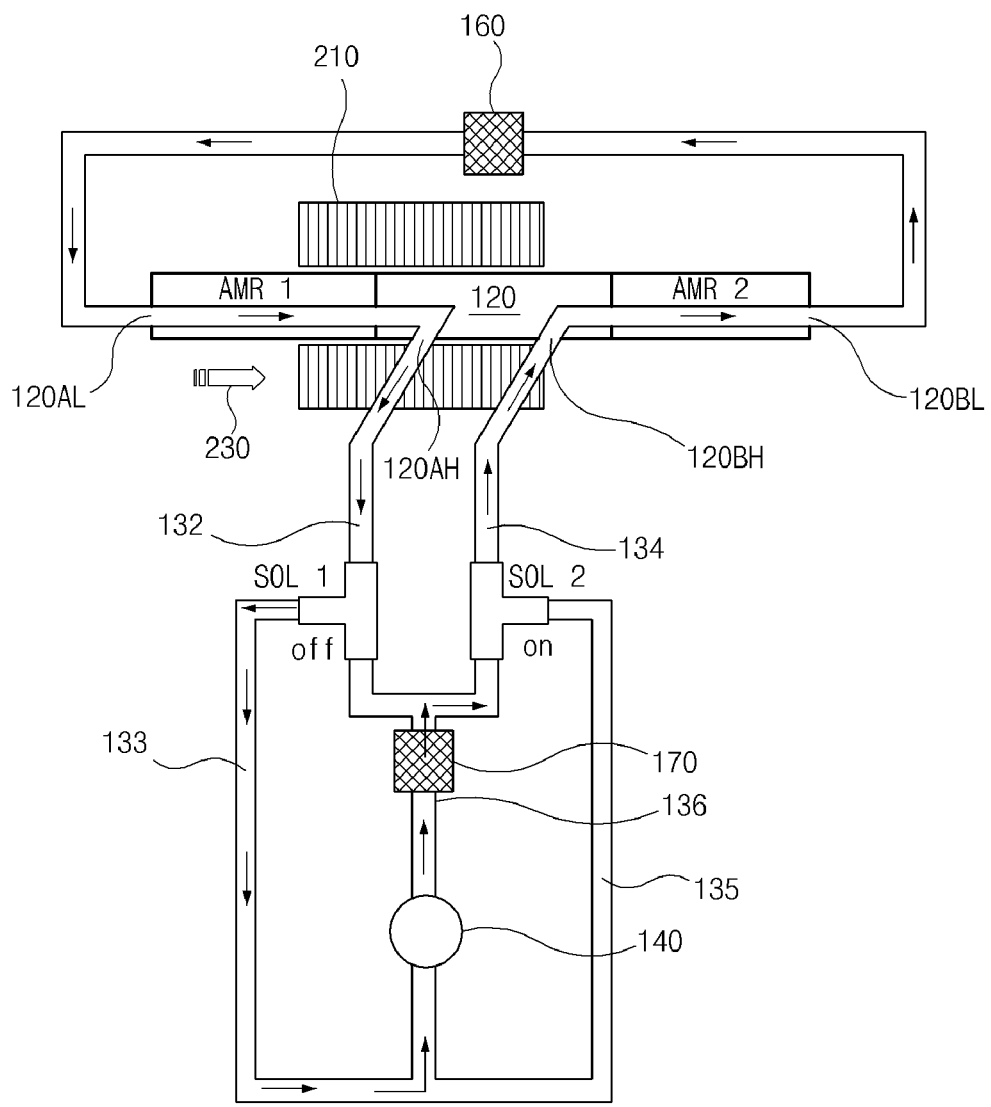
Figure 9:
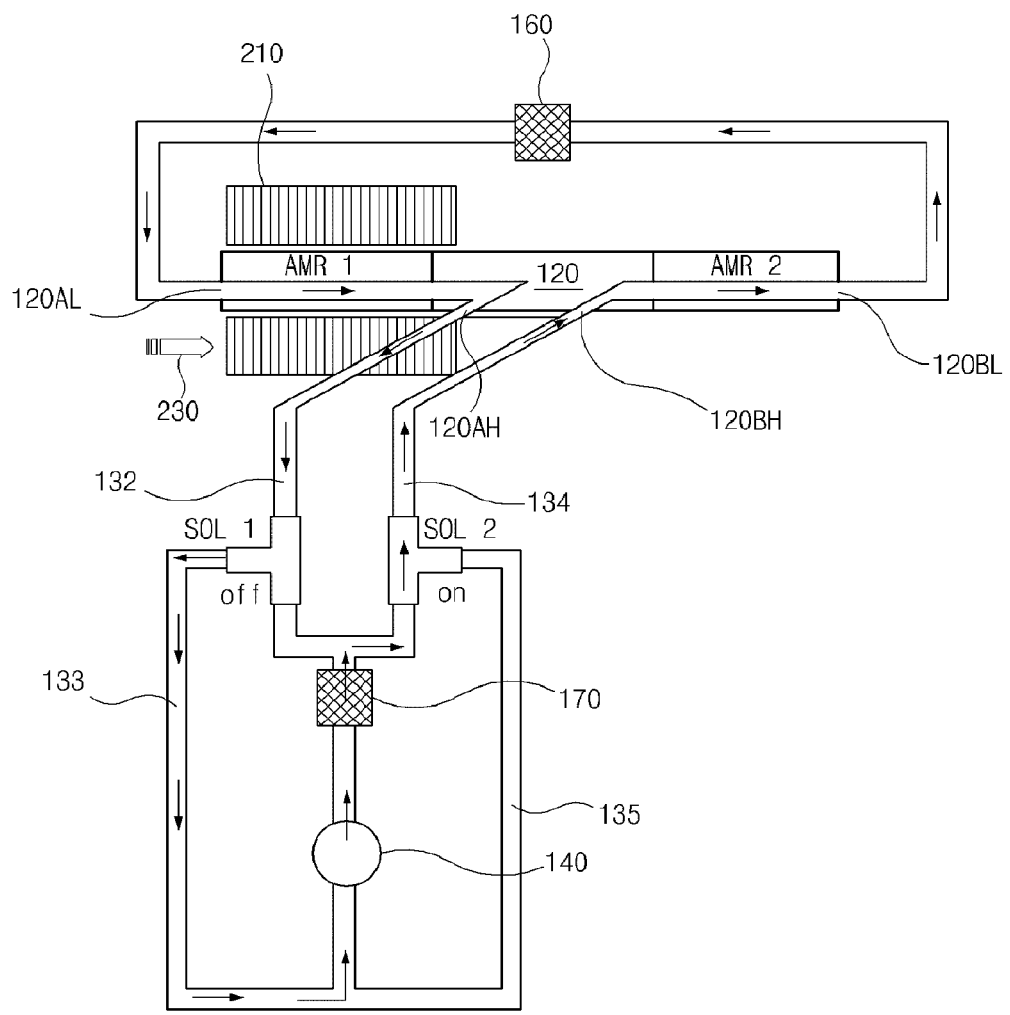

As shown FIG. 8, while the AMR1 enters the magnet 211, the AMR2 moves out of the magnet 211. Therefore, the heat transfer fluid having the atmospheric temperature that has passed through the hot-side heat exchanger 170 is cooled by passing through AMR2 via the heat exchange tube 134, and the heat transfer fluid returns to the atmospheric temperature (actually, to a temperature a little lower than the atmospheric temperature) by passing through the cold-side heat exchanger 160. The heat transfer fluid is then injected into the AMR2 via the heat exchange tube 134. The above-described process forms a cycle. As shown in FIG. 9, the heat transfer fluid flows in a direction identical to that of FIG. 8 when the AMR1 is in the magnet 211 completely and before QMR1 moves out of the magnet 211. At this time, the solenoid valve SOL1 is OFF and the solenoid valve SOL2 is ON, wherein the first cold-side inlet/outlet 120AL and the first hot-side inlet/outlet 120AH serves as a cold-side inlet and a hot-side outlet respectively, and the second hot-side inlet/outlet 120BH and the second cold-side inlet/outlet 120BL serve as a hot-side inlet and a cold-side outlet respectively.

As described above, since the heat transfer fluid having the atmospheric temperature exhausted from the cold-side heat exchanger 160 passes from the cold-side magnetic material at the first far-side inlet/outlet 110AL of AMR1 to the hot-side magnetic material at the first near-side inlet/outlet 110AH of AMR2, the temperature drops from the slope of the initial temperature (shown in dotted line) to the slope of the final temperature (shown in solid line) without being mixed as shown in FIG. 10.

Figure 11:
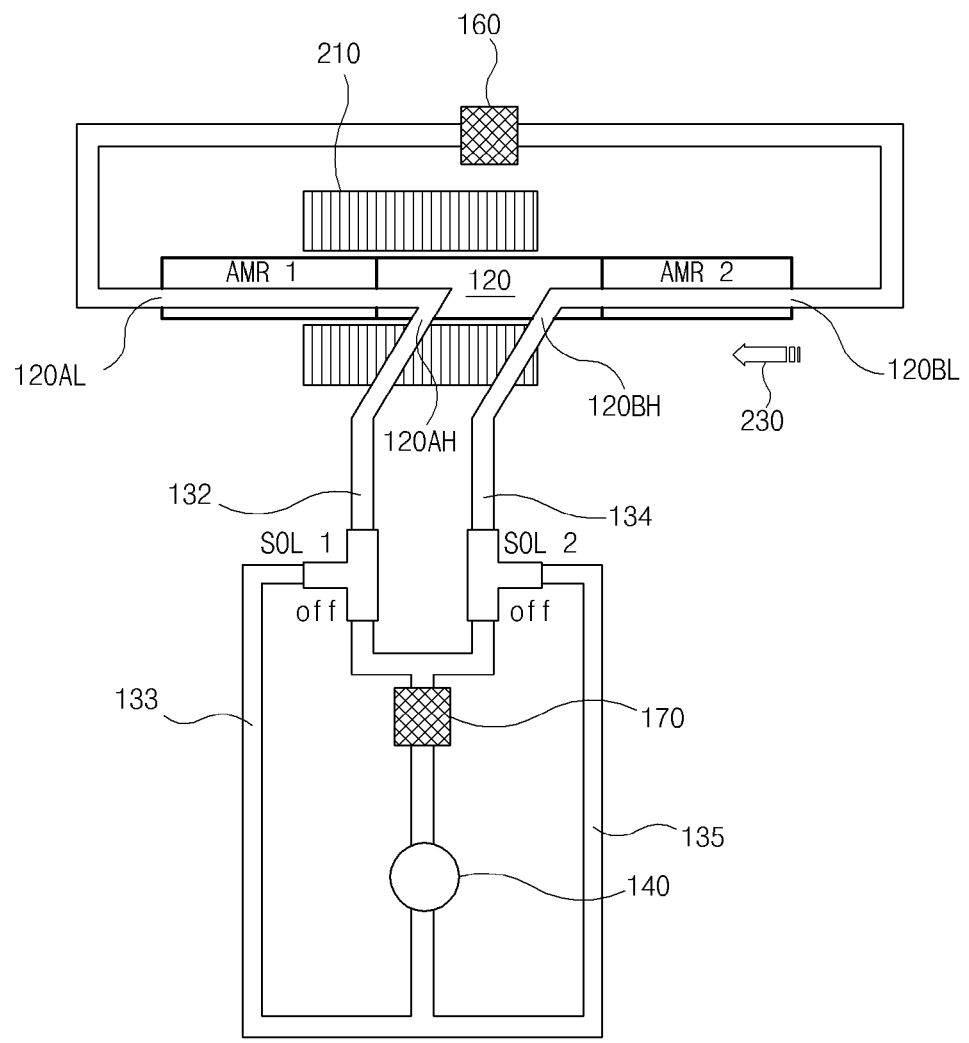
Figure 12:
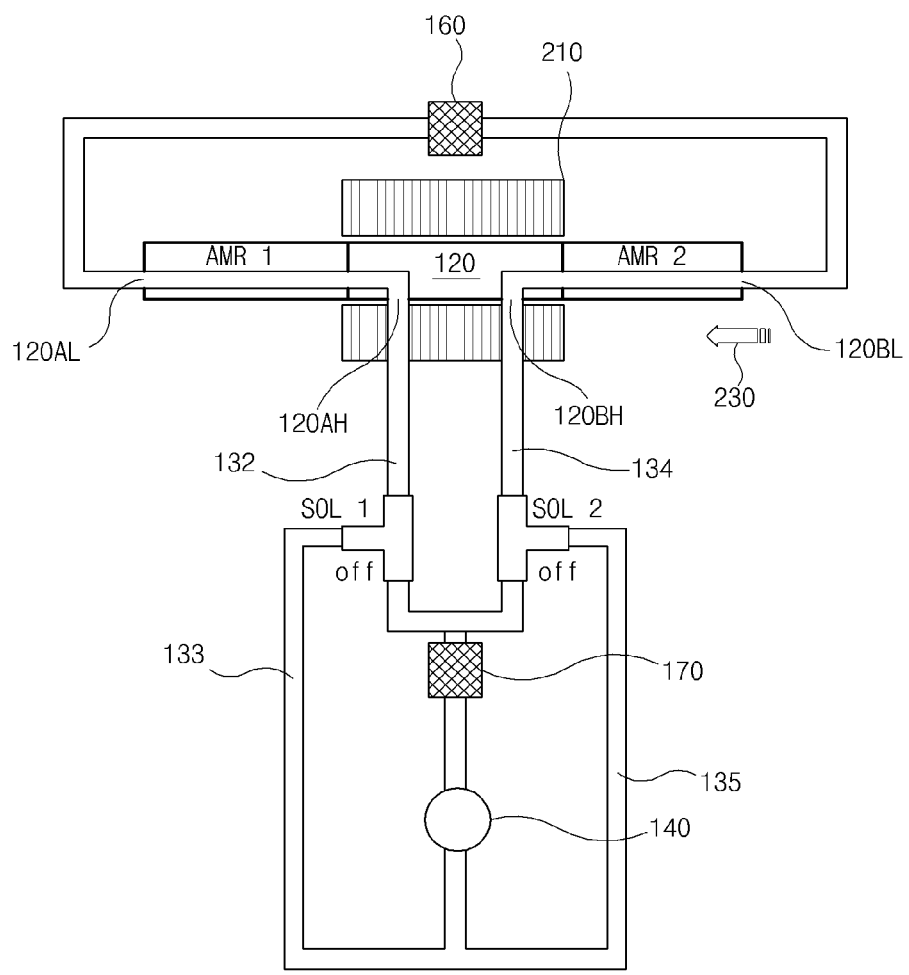

As shown FIGS. 11 and 12, the heat transfer fluid does not flow to the AMR 110 from a moment when the AMR1 starts to move in order to move out of the magnet 211 (all of the solenoid valves are OFF).

Figure 13:
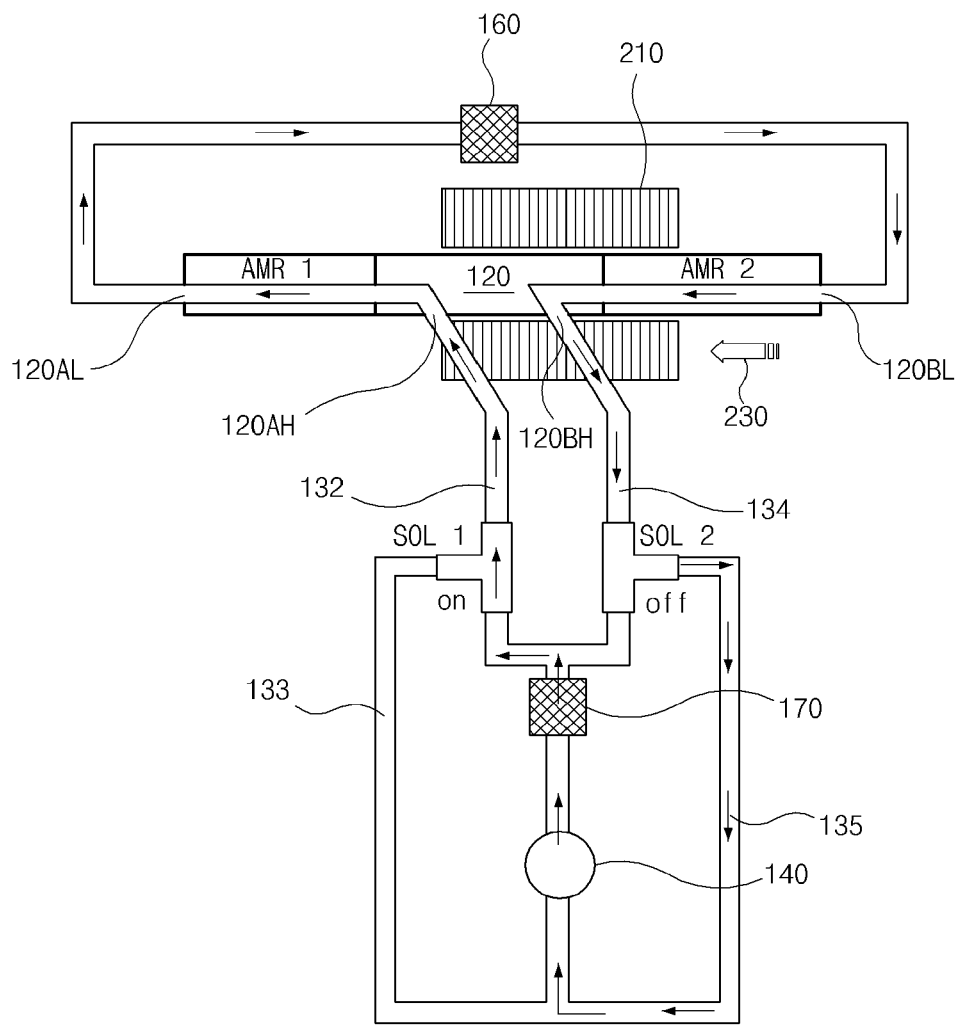
Figure 14:
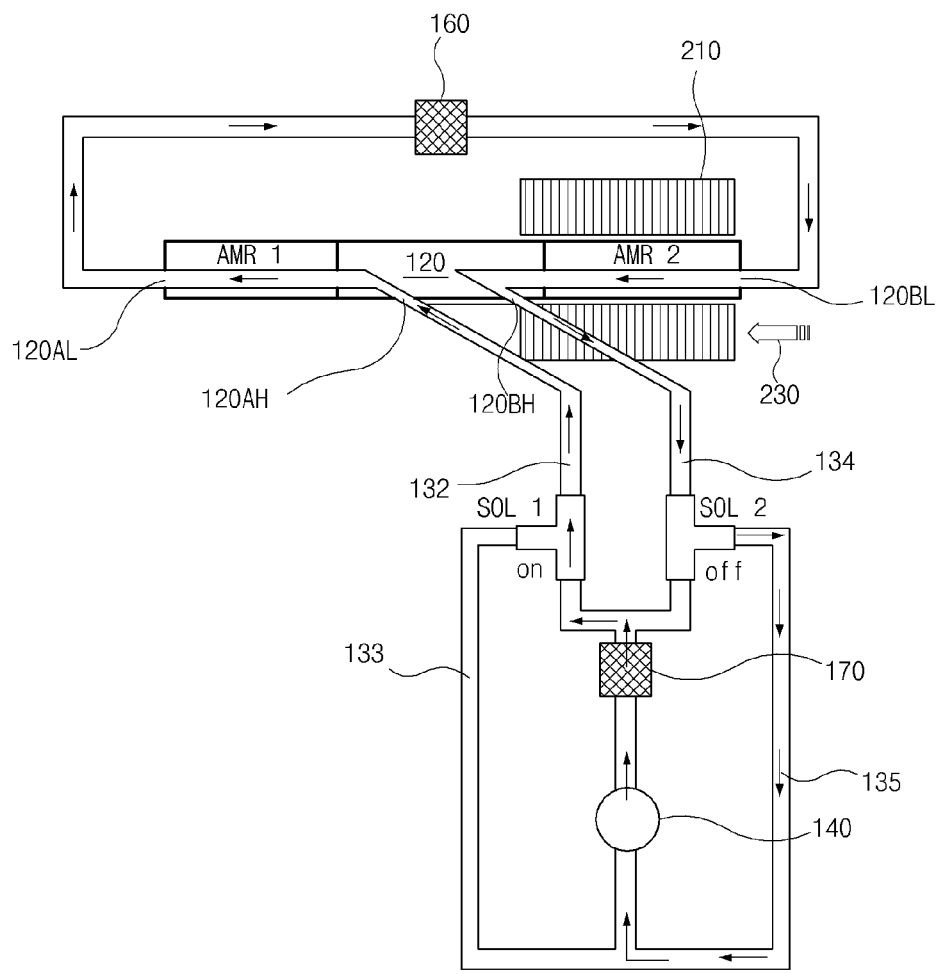

As shown FIGS. 13 and 14, contrary to the cycle described above, while the AMR2 is in the magnet 211, the AMR 1 are out of the magnet 211. Therefore, the heat transfer fluid having the atmospheric temperature that has passed through the hot-side heat exchanger 170 is cooled by passing through the AMR1 via the heat exchange tube 132, and the heat transfer fluid returns to the atmospheric temperature (actually, to a temperature a little lower than the atmospheric temperature) by passing through the cold-side heat exchanger 160. The heat transfer fluid is then heated by passing through the AMR2 and is passed through the heat exchange tube 134, the heat exchange tube 135 and the pump 140. The heat transfer fluid is then passed through the hot-side heat exchanger 170 to return to the atmospheric temperature (actually, to a temperature a little higher than the atmospheric temperature) to enter the AMR1. The above-described process forms a single cycle. At this time, the solenoid valve SOL2 is OFF and the solenoid valve SOL1 is ON, wherein the first hot-side inlet/outlet 120AH and the first cold-side inlet/outlet 120AL serve as a hot-side inlet and a cold-side outlet, and the second cold-side inlet/outlet 120BL and the second hot-side inlet/outlet 120BH serve as a cold-side inlet and a hot-side outlet.

As described above, since the heat transfer fluid having the atmospheric temperature exhausted from the cold-side heat exchanger 160 passes from the cold-side magnetic material at the first far-side inlet/outlet 110BL of the AMR2 to the hot-side magnetic material at the first near-side inlet/outlet 110BH of the AMR1, the temperature drops from the slope of the initial temperature (shown in dotted line) to the slope of the final temperature (shown in solid line) without being mixed as shown in FIG. 10.

Figure 15:
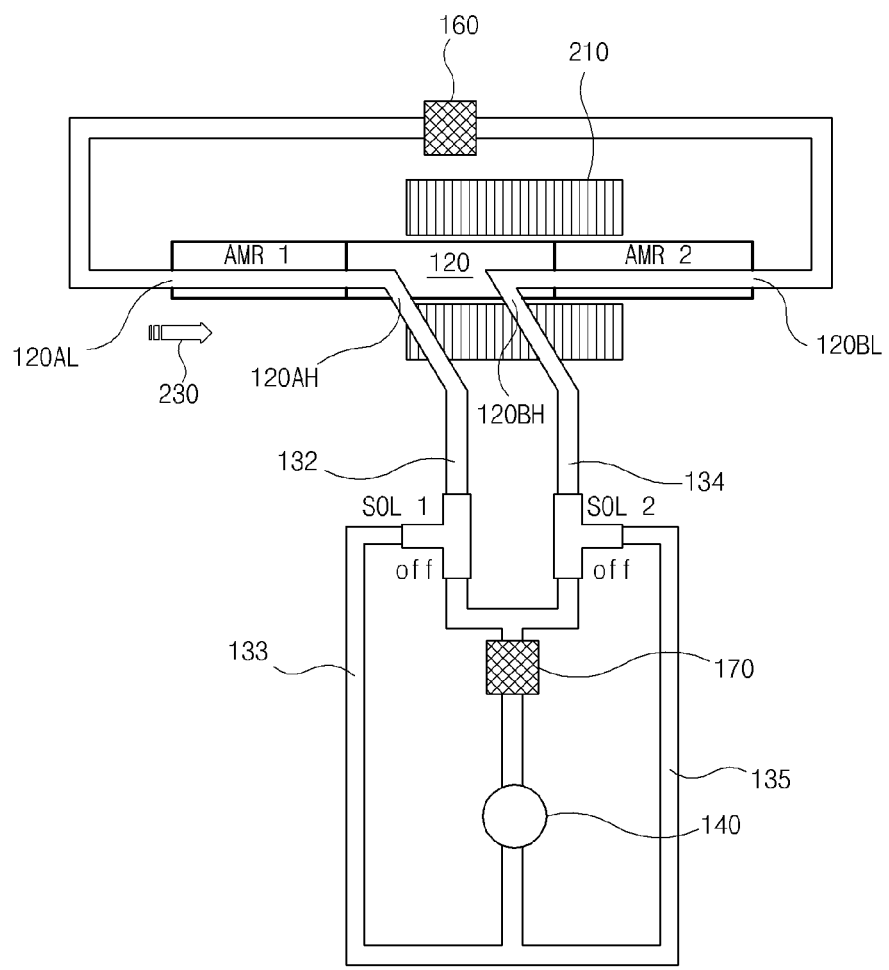
Figure 16:
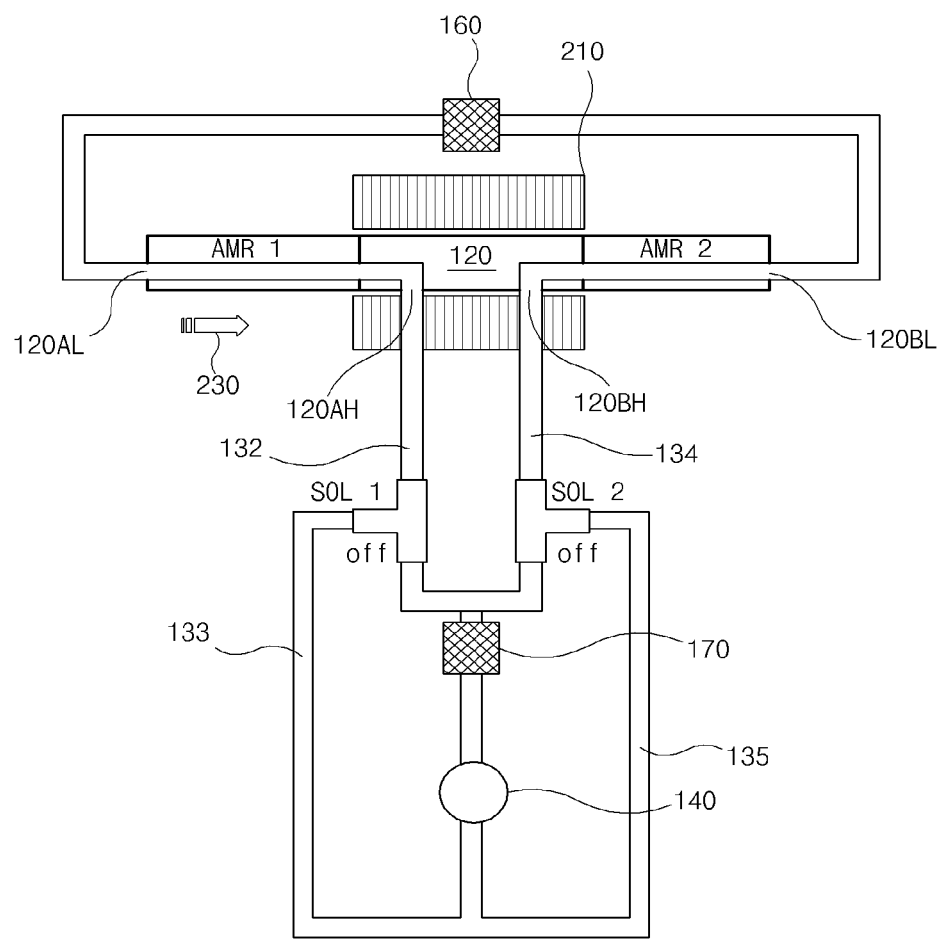

As shown FIGS. 15 and 16, the heat transfer fluid does not flow to the AMR 110 from a moment when the AMR2 starts to move in order to move out of the magnet 211.

Figure 17:
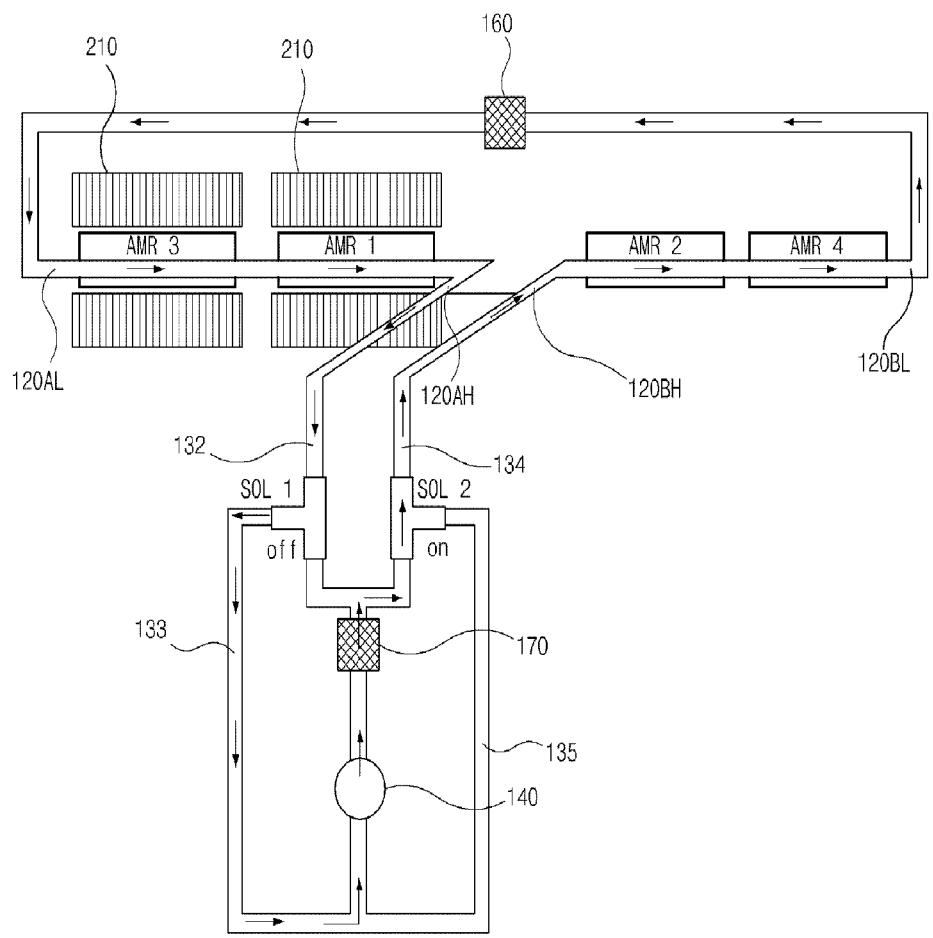
FIG. 17 is a schematic diagram illustrating a multi-step magnetic refrigerating system in accordance with another preferred embodiment of the present invention.

In addition, as shown in FIG. 17, a multi-step magnetic refrigerating effect may be obtained by connecting more AMRs and magnets.

In accordance with a characteristic of the cycle of the magnetic refrigerator, the cold-side heat exchanger 160 is connected between the cold-side magnetic material of the first AMR bed and the cold-side magnetic material of the second AMR bed such that the heat transfer fluid flows from the hot-side magnetic material to the cold-side magnetic material. Therefore, since a temperature of an entire of the ARM bed drops while maintaining the same temperature slope, a degradation of a performance co-efficient is suppressed to be used in accordance with the original purpose thereof such as in the air conditioner.

In addition, an advantage of the cycle of the magnetic refrigerator in accordance with the preferred embodiment of the present invention lies in that the heat exchange efficiency is improved by employing a structure wherein the heat transfer fluid directly passes through the magnetic material, and the two AMRs 110 are connected for more magnetic material, resulting in double cooling effects. In addition, the AMR includes the ribbed compartments 114A and 114B which prevent the distortion of a shape of the AMR due to the pressure of the heat transfer fluid. Even when the distortion occurs, the heat transfer fluid cannot bypass the magnetic material due to the structure of the distribution chamber, resulting in a high heat exchange efficiency. Moreover, while the AMR 110 having a shape of a simple plate, the AMR 110 provides the high efficiency and is formed in plastic for an easy molding.

In addition, since the magnetic refrigerator in accordance with the preferred embodiment of the present invention employs a shuttle type AMR cycle operation, the high cooling effect is provided due to a temperature slope of a low temperature and a high temperature. As described above, the heat transfer fluid flows from the cold-side to the hot-side and the heat transfer fluid does not flow into the AMR while the AMR moves out of the magnet. The heat transfer fluid flows from the hot-side to the cold-side after the AMR is cooled by moving out of the magnet. For instance, the heat transfer fluid is injected into the AMR2 After the cooled heat transfer fluid passed through the cold-side heat exchanger such that the heat transfer fluid passes through both of the AMR1 and AMR2.

In addition, since the hot-side heat exchanger is disposed at the outlet of the pump, the hot-side heat exchanger cools the heat transfer fluid heated by the pump to the atmospheric temperature prior to entering the AMR.

Moreover, the magnetic material has a characteristic wherein the temperature thereof is changed when the magnetic field is applied. The magnetocaloric material 112 comprises a gadolinium (Gd) of a fine powder type. The gadolinium has pores having a high osmosis to the flow of the heat transfer fluid, and a superior absorption and emission of a heat.

While the present invention has been particularly shown and described with reference to the preferred embodiment thereof, it will be understood by those skilled in the art that various changes in form and details may be effected therein without departing from the spirit and scope of the invention as defined by the appended claims. For instance, the AMR nozzles may be formed at both ends of the AMR, and a connector that does not have the AMR nozzle may be connected to the AMR.

Industrial Applicability

As described above, the regenerator and the magnetic refrigerator using the same in accordance with the present invention have following advantages.

As a first advantage, since the heat transfer fluid flows from the cold-side magnetic material to the hot-side magnetic material, the temperature of the entire of the ARM bed drops while maintaining the same temperature slope. Therefore, a width between the slopes of the initial and the final temperatures which are the original purpose of the AMR may be increased.

As a second advantage, since the magnetic refrigerator includes the distribution chamber having a size almost identical to that of the cross-section of the magnetic material of the AMR bed, the heat transfer fluid flows uniformly throughout the magnetic material, resulting in a suppression of the corrugation formed by partial flow thereof to improve the heat exchange efficiency.

As a third advantage, the heat exchange efficiency is improved by employing the shuttle type twin AMR cycle operation.

As a fourth advantage, the heat exchange efficiency is improved by employing the structure wherein the heat transfer fluid always passes through the magnetic material.

As a fifth advantage, the leakage of the heat transfer fluid and the magnetic material is prevented by using the mesh and the plastic packing.

As a sixth advantage, the heat exchange efficiency is doubled using the two AMRs.

As a seventh advantage, an adiabatic state is achieved by employing the plastic AMR and by preventing an exposure of the magnetic material to outside, resulting in the improvement of the heat exchange efficiency.

As a eighth advantage, since the through-hole of the AMR bed has the upper and the lower through-holes divided by the ribbed compartment, the distortion of a shape of the AMR due to the pressure of the heat transfer fluid is prevented. Even when the distortion occurs, the heat transfer fluid cannot bypass the magnetic material due to the structure of the distribution chamber, resulting in the high heat exchange efficiency.

The invention claimed is:

1. A shuttle type magnetic refrigerator, comprising:
   an AMR including a first AMR bed and a second AMR bed including a magnetic material for passing through a flow of a heat transfer fluid, an AMR connector being disposed between the first AMR bed and the second AMR bed, a first hot-side nozzle and a second hot-side nozzle being disposed at both ends of the AMR connector;
   a magnet;
   an AMR moving member for reciprocating the first AMR bed and the second AMR bed to the magnet to mutually apply or erase a magnetic field; and
   cold-side and hot-side heat exchangers thermally connected to the first AMR bed and the second AMR bed,
   wherein each of the first AMR bed and the second AMR bed comprises a near-side inlet/outlet and a far-side inlet/outlet, the near-side inlet/outlet being disposed at a close end thereof closer to the magnet and a far-side inlet/outlet disposed at a far end thereof farther from the magnet compared to the near-side inlet/outlet, the cold-side heat exchanger is disposed between the far-side inlet/outlet of the first AMR bed and at the far-side inlet/outlet of the second AMR bed, the first AMR bed includes first through-holes being filled up with the magnetic material in a lengthwise direction thereof, the second AMR bed includes second through-holes being filled up with the magnetic material in a lengthwise direction thereof, each of the first through-holes and the second through-holes comprising an upper through-hole and a lower through-hole divided by a ribbed compartment, a first cold-side AMR nozzle connected to the first through-holes is coupled to the far- side inlet/outlets of the first AMR bed, a second cold-side AMR nozzle connected to the second through-holes is coupled to the far-side inlet/outlets of the second AMR bed, a first hot-side AMR nozzle connected to the first through-holes is coupled to the near-side inlet/outlets of the first AMR bed, a second hot-side AMR nozzle connected to the second through-holes is coupled to the near-side inlet/outlets of the second AMR bed, and at least one of the AMR nozzles includes a distribution chamber which uniformly distributes the heat transfer fluid to an entirety of a cross-section of the through holes.

2. The refrigerator in accordance with claim 1, wherein a material of the AMR includes a plastic, and wherein a mesh and a packing are disposed at the near-side inlet/outlet and the far-side inlet/outlet of the first AMR bed and the near-side inlet/outlet and the far-side inlet/outlet of the second AMR bed, respectively.

* * * * *